H. ELLERBROCK & C. MAHLER.
Improvement in Beer Coolers.
No. 123,465. Patented Feb. 6, 1872.
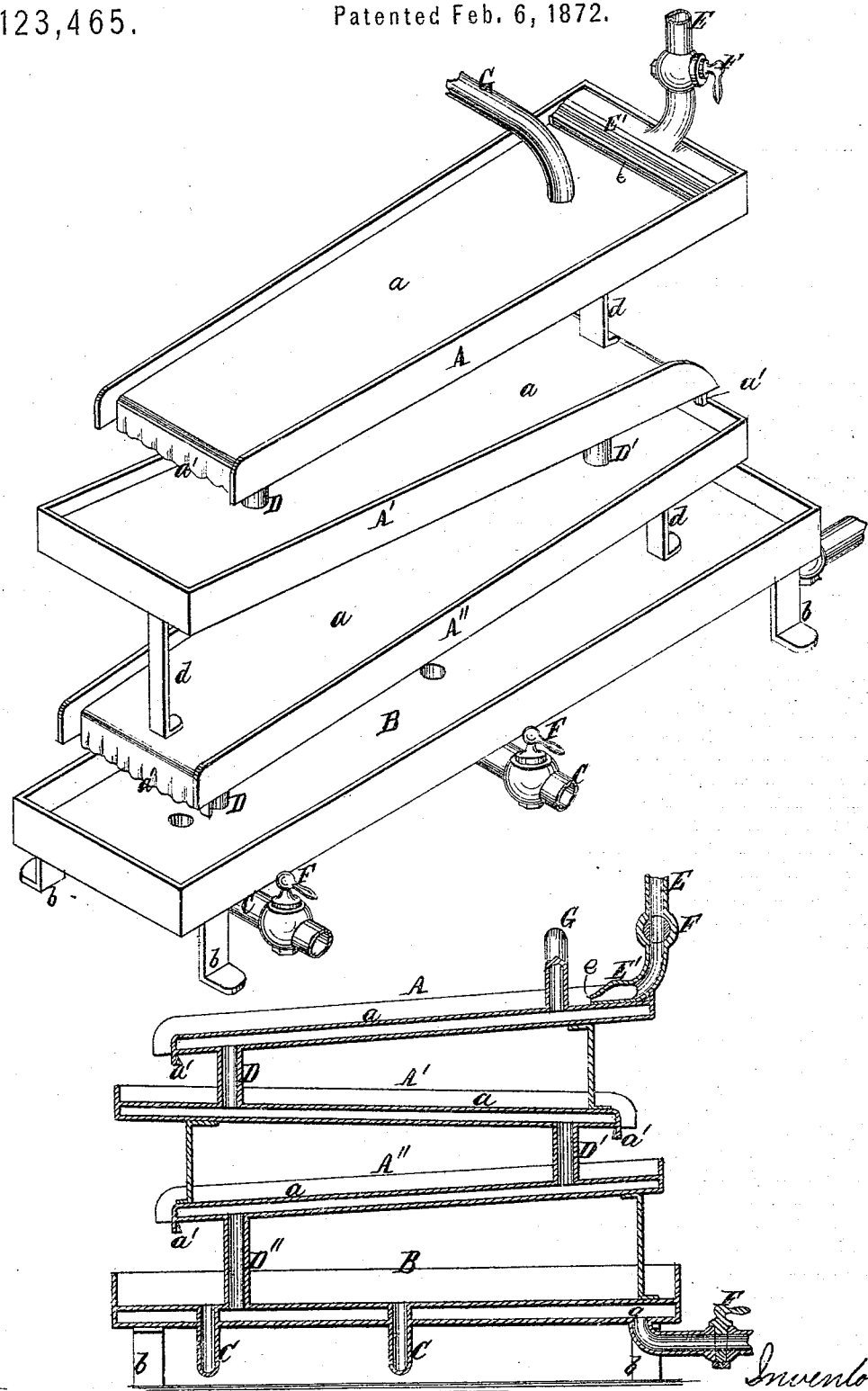

UNITED STATES PATENT OFFICE.

HERMANN ELLERBROCK AND CHRISTIAN MAHLER, OF BALTIMORE, MD.

IMPROVEMENT IN BEER-COOLERS.

Specification forming part of Letters Patent No. 123,465, dated February 6, 1872.

Specification of an Improvement in Beer-Coolers, invented by HERMANN ELLERBROCK and CHRISTIAN MAHLER, of the city of Baltimore, in the State of Maryland.

Our beer-cooler consists of a number of broad flat pans inclining in opposite directions, and arranged one above another in such positions that the beer to be cooled will fall in an attenuated sheet or shower from the lower end of one trough into the next below, near its upper end, until it is finally discharged through one, two, or more pipes from a horizontal trough or tray forming the bottom of the series. The pans are formed hollow, to contain water or other cooling agent, which, being introduced in a cold state into the chamber within the bottom pan, passes up into the successive chambers through connecting-pipes, which may form supports for the pans. The beer is first introduced through a spreading-nozzle, causing it to spread over the entire upper surface of the top pan, and, at the discharge end of each pan, flows over a corrugated lip or flange, causing it to drip in an attenuated shower, thus presenting a larger surface of the liquid to the atmosphere and cooling-surface.

In the drawing, Figure 1 is a perspective view of our improved beer-cooler. Fig. 2 is a vertical longitudinal section thereof.

A A' A'' represent the pans, which are hollow and inclined in opposite directions, arranged one above the other; B, the horizontal trough or tray supported upon legs $b$, forming the bottom of the series, and into which the beer is finally discharged from the pans. C C are pipes, through which the beer is discharged from the trough or tray B. The bottoms $a$ of these pans A, at their discharge or lower ends, are turned down, forming lips or flanges $a$, which are corrugated, as shown. D D' D'' are the cold-water pipes, which form the support for the lower ends of the pans, their other or higher ends being supported by stays $d$, of which a number may be employed, in any necessary positions. E is the pipe leading from the beer-vats or tanks, provided with a broad nozzle or discharge-spout, E', extending from side to side of the pan. The mouth of this nozzle is made very small, as shown at $e$, to spread the beer over the entire upper surface of the pan. F are cocks in the water and beer pipes to regulate the supply of water or beer, or to entirely cut it off, if necessary.

The beer, coming from the vats or tanks (not shown) through the pipe E, is first introduced to the pans A through the spreading-nozzle E', which causes it, by passing through its narrow mouth $e$, to spread over the entire surface of the pan; thence it passes down, by gravity, to the lower or discharge end and flows over the corrugations $a'$ in the lip or flange of the bottom $a$ of the pans, causing the beer to drip in an attenuated shower to the pan below. This is continued until the beer reaches the lower horizontal trough or tray B, from which it is finally discharged through the pipes C C. These pipes C may lead to another or to several different cellars or to another series of pans, to go through the same operation again, or directly to the delivery-pipe. While the beer is flowing down over these pans a constant stream of ice-water, which enters between the partitions of the horizontal trough B at $g$, is passing up through the pipe D'' to the hollow bottom of the inclined pan A''; thence through the pipe D' to the hollow bottom of the inclined pan A; and thence through the pipe D to the hollow bottom of the incline pan A, from whence it is finally discharged through the pipe G.

By this arrangement of having the beer pass over the top of the pans and the water circulate between them instead of the beer passing through inclosed spaces, as is usual, the beer is cooled not only by contact with a broad cooling-surface, but by evaporation from exposure to the atmosphere while spread out upon the pans, and also while falling in a thin attenuated sheet or shower from one to another. This evaporation greatly assists in cooling, and lessens the amount of ice required; hence the process is much more economical.

We are aware that Charles P. Zimmerman obtained a patent on the 28th of November, 1865, for a liquid-cooler, consisting of a series of chutes placed in an inclined position, communicating with each other through curved aprons, and chambers for the cooling liquid communicating with each other through pipes. This, therefore, we do not claim. Our apparatus is superior to that of Zimmerman in several particulars. The beer, being applied through a spreading-nozzle, is, at the beginning of its flow, distributed over the entire width of the first pan; the aprons or lips are disconnected from the plates below, onto the upper ends of which they distribute the beer in successive showers; and these appliances enable us to use smooth pans, by which a larger surface of the beer is exposed to the air.

We claim as our invention—

The combination, with the vertical series of cooling-pans A A' A'' formed with smooth upper surfaces and discharging precipitately from one onto another, of the spreading-nozzle E and corrugated lips $a'$ for spreading the beer over the entire upper external surface of each pan and securing its discharge in attenuated showers, as herein represented and described, for the purpose set forth.

H. ELLERBROCK.
CHR. MAHLER.

Witnesses:
OCTAVIUS KNIGHT,
WALTER ALLEN.